United States Patent
Leamy et al.

(10) Patent No.: US 6,498,978 B2
(45) Date of Patent: Dec. 24, 2002

(54) SYSTEM AND METHOD FOR MONITORING THERMAL STATE TO NORMALIZE ENGINE TRENDING DATA

(75) Inventors: Kevin Richard Leamy, Loveland, OH (US); Ronald George Maruscik, Lebanon, OH (US)

(73) Assignee: General Electric Company, Schenectady, NY (US)

(*) Notice: Subject to any disclaimer, the term of this patent is extended or adjusted under 35 U.S.C. 154(b) by 18 days.

(21) Appl. No.: 09/861,337

(22) Filed: May 18, 2001

(65) Prior Publication Data

US 2002/0173897 A1 Nov. 21, 2002

(51) Int. Cl.[7] ............................................... G06F 17/00
(52) U.S. Cl. .......................................... 701/100; 701/29
(58) Field of Search .......................... 701/29, 35, 100, 701/3; 60/39.141, 39.142; 73/116, 118.1

(56) References Cited

U.S. PATENT DOCUMENTS

| | | | |
|---|---|---|---|
| 4,215,412 A | * 7/1980 | Bernier et al. ............... 701/100 |
| 4,891,971 A | * 1/1990 | Jones et al. .................. 340/959 |
| 5,107,674 A | * 4/1992 | Wibbelsman et al. ......... 60/778 |
| 5,583,420 A | * 12/1996 | Rice et al. ..................... 322/25 |
| 5,680,310 A | * 10/1997 | Morgan et al. ............. 701/100 |
| 5,845,483 A | * 12/1998 | Petrowicz ................ 60/39.163 |

* cited by examiner

Primary Examiner—Michael J. Zanelli
(74) Attorney, Agent, or Firm—Pierce Atwood

(57) ABSTRACT

A method and system for monitoring engine performance in a gas turbine engine uses a plurality of sensors to sense data related to the operation and performance of the gas turbine engine. Selected data parameters from the sensed data are continuously sampled prior to completion of an engine start sequence. The selected data parameters are then evaluated to determine whether specific criteria have been met, and evaluation data are captured whenever the criteria are met. The evaluation data are used to normalize engine performance data to a particular thermal state of the engine. The normalized engine performance data are then trended by comparing it to a parametric baseline for the gas turbine engine.

18 Claims, 2 Drawing Sheets

SYSTEM AND METHOD FOR MONITORING THERMAL STATE TO NORMALIZE ENGINE TRENDING DATA

BACKGROUND OF THE INVENTION

This invention relates generally to gas turbine engines and more particularly to monitoring the thermal state in such engines.

Gas turbine engines are used for a wide variety of aeronautical, marine and industrial applications. Generally, a gas turbine engine includes a compressor that provides pressurized air to a combustor, wherein the air is mixed with fuel and the mixture is ignited for generating hot combustion gases. These gases flow downstream to a turbine section that extracts energy therefrom to drive the compressor and provide useful work. In many applications, gas turbine engines are routinely subject to various maintenance procedures as part of their normal operation. To aid in the provision of such maintenance services, monitoring systems are often employed to provide diagnostic monitoring of the gas turbine engine. These systems commonly include performance monitoring equipment that collects relevant trend and fault data used for diagnostic trending. In diagnostic trend analysis, certain process data (such as exhaust gas temperature, fuel flow, rotor speed and the like) that are indicative of overall engine performance and/or condition are compared to a parametric baseline for the gas turbine engine. Any divergence of the raw trend data from the parametric baseline may be indicative of a present or future condition that requires maintenance.

For example, modem aircraft currently operated by commercial airlines typically employ an onboard data acquisition system for collecting digital flight data to use in diagnostic monitoring. In such systems, a number of sensors distributed throughout the aircraft and engines provide data signals representative of the performance of the aircraft and its engines. Such data can be recorded onboard and accessed later by ground maintenance personnel or, alternatively, can be remotely transmitted to ground locations during flight operations for real-time processing.

Engine condition monitoring techniques typically use a screening process to identify various phases of operation and then extract specific data during the flight phases of interest. Currently, data collection is conducted during flight phases such as take off, climb and steady cruise, because these are the phases during which engine anomalies are most likely to be detected. Data collected during the takeoff phase can be strongly influenced by the engine's thermal state at engine start-up. For example, bearing and rotor clearances are generally more open during a cold rotor start (e.g., the first start of the day) than during a hot start (e.g., a start after a recently concluded flight). This means that rubbing and rotor bow are more likely to occur during hot starts.

Accordingly, it is desirable to be able to monitor engine thermal state characteristics in gas turbine engines prior to engine start-up for the purpose of normalizing general engine performance characteristics.

BRIEF SUMMARY OF THE INVENTION

The above-mentioned need is met by the present invention, which provides a method and system for monitoring engine performance in a gas turbine engine in which a plurality of sensors are used to sense data related to the operation and performance of the gas turbine engine. Selected data parameters from the sensed data are continuously sampled prior to completion of an engine start sequence. The selected data parameters are then evaluated to determine whether specific criteria have been met, and evaluation data are captured whenever the criteria are met. The evaluation data are used to normalize engine performance data to a particular thermal state of the engine. The normalized engine performance data are then trended by comparing it to a parametric baseline for the gas turbine engine.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
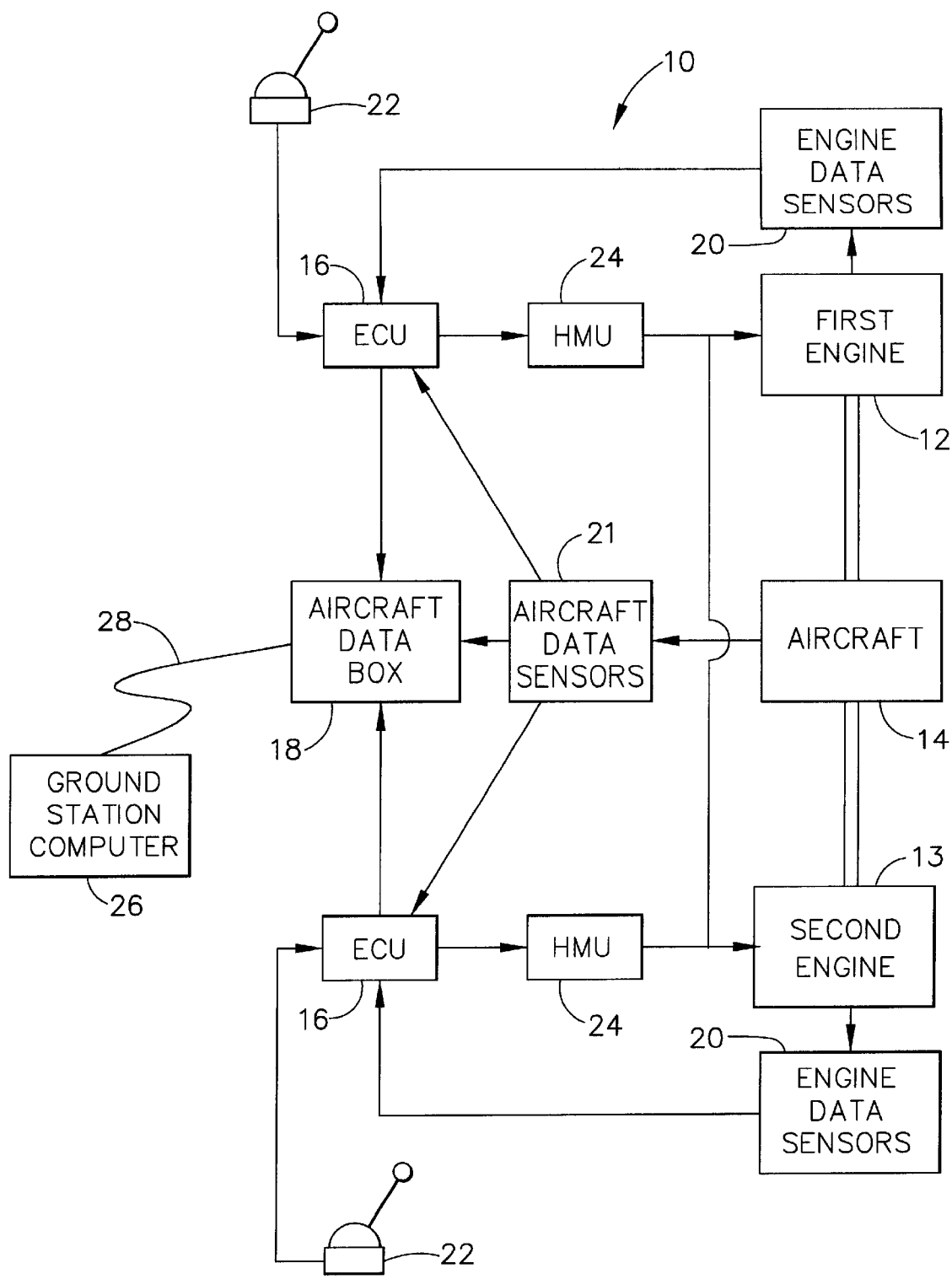
FIG. 1 is a schematic diagram of a system for monitoring engine performance in gas turbine engines, including an algorithm for monitoring engine thermal state characteristics prior to engine start-up.

Referring to the drawings wherein identical reference numerals denote the same elements throughout the various views, FIG. 1 shows a block diagram of system 10 for monitoring the performance of gas turbine engines 12, 13 mounted on an aircraft 14. Although two engines 12, 13 are shown in FIG. 1, it should be noted that the aircraft 14 could have additional engines mounted thereon. As will be apparent from the following description, data collection for such additional engines would be accomplished in a manner identical to that for engines 12, 13. Therefore, only engines 12, 13 and the associated equipment will be described herein. Furthermore, it should be noted that the system 10 is described in connection with an aircraft only by way of example. In addition to aeronautical applications, the present invention is applicable to other applications of gas turbine engines, including marine and industrial applications.

The system 10 includes an electronic control unit (ECU) 16, such as a full authority digital engine control (FADEC) although other controllers can be used, associated with each engine 12, 13 and an onboard aircraft data box 18. Conventional engine data sensors 20 and aircraft data sensors 21 are provided to sense selected data parameters related to the operation and performance of the engines 12, 13 and/or the aircraft 14. The engine data sensors 20 and aircraft data sensors 21 can comprise any group of sensors that monitor data parameters of interest. In addition to aircraft parameters such as ambient temperature, air speed and altitude, engine parameters would typically include exhaust gas temperature, oil temperature, component temperatures such as high pressure turbine shroud temperature, engine fuel flow, core speed, compressor discharge pressure, turbine exhaust pressure, fan speed, and the like.

Each ECU 16 receives signals from the corresponding engine data sensors 20 and the aircraft data sensors 21 as is known in the art. Each ECU 16 also receives a thrust request signal from a corresponding throttle 22 controlled by the aircraft's pilot. In response to these inputs, the ECUs 16 generate command signals to operate engine actuators, such as hydromechanical units (HMU) 24 that meter the flow of fuel to the respective engine 12, 13. The HMUs 24 are units that are well known to those skilled in the art. Each ECU 16 also outputs data signals to the aircraft data box 18. The aircraft data box 18, which can be any conventional device such as a flight data recorder, quick access recorder, or any other type of in-flight data storage device, has a relatively large data storage capacity for storing the data signals. The aircraft data box 18 could also contain processing capability to analyze data in-flight and only send the necessary maintenance messages to an aircraft centralized maintenance computer (not shown). The aircraft data box 18 also receives signals from the aircraft data sensors 21.

As is known in the art, each engine 12, 13 includes an engine starting system having an engine turbine starter that is mounted on the engine's gearbox. During an engine start sequence, high pressure auxiliary air is delivered to the starter, which causes the engine core to rotate via the gearbox. The ECUs 16 schedule fuel delivery and variable geometry adjustments to complete the engine start sequence and bring the respective engine 12, 13 to idle operating condition. Typically, the source of auxiliary air is an auxiliary power unit (APU) which is usually located in the tail of an aircraft 14, a ground cart, or cross bleed from another engine.

The system 10 includes an algorithm that processes the data signals for monitoring engine performance characteristics. The monitoring algorithm can be implemented in a number of ways. For example, the monitoring algorithm could be implemented on the ECUs 16 wherein the data signals are processed as they are received by the ECUs 16. Alternatively, the monitoring algorithm could be implemented on the aircraft data box 18. In this case, the data signals would be processed after being transferred to the aircraft data box 18. Another alternative is to implement the monitoring algorithm on a ground station computer 26, such as personal or workstation computer. The data signals stored in the aircraft data box 18 during a flight are downloaded to the ground station computer for processing. This transfer can be accomplished after the flight via any sort of link 28 including use of a removable computer-readable medium, such as a floppy disk, CD-ROM or other optical medium, magnetic tape or the like, or a wireless communication link. It is also possible to remotely transmit the data signals directly to the ground station computer 26 during flight operations for real-time processing. With any implementation, the monitoring algorithm can be stored on the unit (be it the ECU, aircraft data box or ground station computer) and accessed from there, or alternatively, it could be accessed from a removable computer readable medium inserted into the appropriate drive of the unit. The monitoring algorithm could also be accessed via the Internet or another computer network. As used herein, the term "computer-readable medium" refers generally to any medium from which stored data can be read by a computer or similar unit. This includes not only removable media such as the aforementioned floppy disk and CD-ROM, but also non-removable media such as a hard disk or integrated circuit memory device in each ECU 16, aircraft data box 18 or ground station computer 26.

Figure 2:
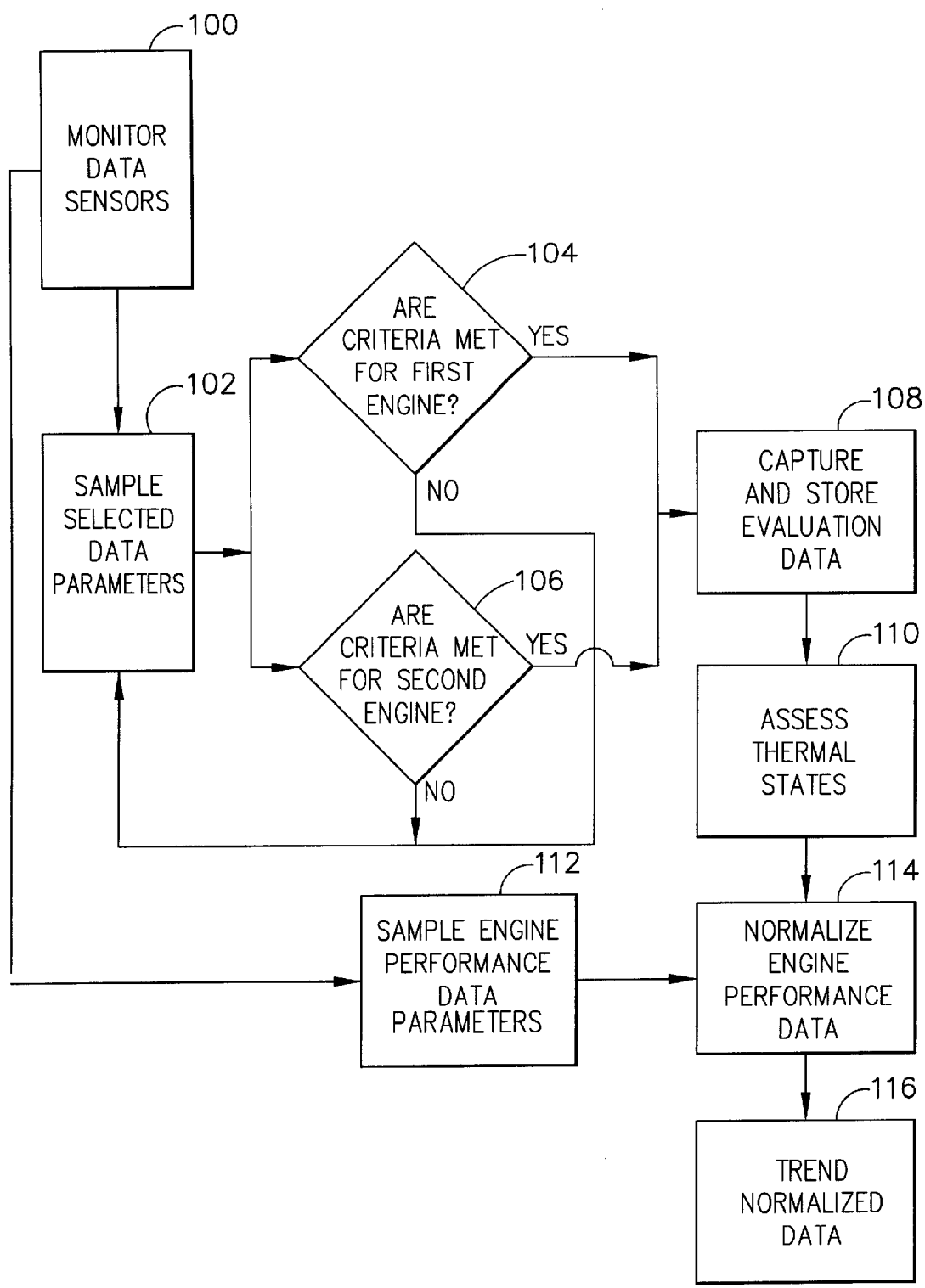
FIG. 2 is a flow chart illustrating an algorithm for monitoring engine thermal state characteristics prior to engine start-up.

Referring now to FIG. 2, the monitoring algorithm is described in more detail. The algorithm is initiated whenever an engine start sequence is begun. The first step, shown at block 100, is to continuously monitor the output of the engine data sensors 20 and aircraft data sensors 21. Next, at block 102, selected data parameters sensed by the data sensors 20 and aircraft data sensors 21 are continuously sampled. Typically, the data parameters are sampled at a high frequency, such as every 15–60 milliseconds, to collect a large volume of data points. Which data parameters are sampled can vary depending on a number of factors. By way of example only, the monitoring algorithm will be described herein with core speed and fuel flow as the selected data parameters. However, it should be noted that the present invention is not limited to these particular data parameters and could be used with any suitable set of data parameters.

Next, each data sample is evaluated to determine whether specific criteria have been met, as denoted at blocks 104 and 106. The purpose of this portion of the monitoring algorithm is to identify, for each engine 12, 13, the specific time prior to completion of the engine start sequence at which the engine thermal state is to be determined. In each instance, if the criteria are met at either of blocks 104, 106, then the monitoring algorithm proceeds to block 108 where selected engine and aircraft data and time when the criteria are met are captured and stored. That is, as each particular set of decision criteria is met, current engine and aircraft data, referred to hereinafter as "evaluation data," are captured and stored with the corresponding data sampling time. If the criteria are not met-at either of blocks 104, 106, then the monitoring algorithm returns to block 102 so that the data parameters are continually sampled until the criteria for each block 104, 106 have been met.

Again by way of example only, the monitoring algorithm will be described herein by using two categories for which the data samples are evaluated against a set of decision criteria. The data parameters are evaluated against decision criteria for the first engine 12 at block 104, and against decision criteria for the second engine 13 at block 106.

More specifically, the decision criteria of block 104 are such that evaluation data are captured before the engine start sequence for the first engine 12 is completed. For example, the decision criteria could be: 1) the starter valve is open, 2) fuel flow is off, and 3) the core speed is greater than or equal to 25% of the maximum core speed. If all of these criteria are met (indicating that the engine start sequence has begun but is not yet completed), then the pertinent engine and aircraft data at that specific time are captured and stored at block 108.

Similarly, the decision criteria of block 106 are such that evaluation data are captured before the engine start sequence for the second engine 13 is completed. For example, the decision criteria could be: 1) the starter valve is open, 2) fuel flow is off, and 3) the core speed is greater than or equal to 25% of the maximum core speed. If all of these criteria are met (indicating that the engine start sequence has begun but is not yet completed), then the pertinent engine and aircraft data at that specific time are captured and stored at block 108.

The evaluation data parameters that are captured at block 108 are not necessarily the same as the data parameters sampled at block 102, although one or more of the same data parameters can be used at both steps. The reason that the data parameter sets can differ is that the data are used for different reasons. The purpose for sampling data at block 102 is to identify when to collect evaluation for subsequent use. At block 108, the goal is to capture evaluation data that will be used for assessing the engine thermal state and normalizing engine performance data. Thus, examples of preferred evaluation data parameters captured at block 108 include oil temperature, high pressure turbine (HPT) shroud temperature, ambient temperature, exhaust gas temperature (EGT) and core speed. It should be pointed out that the present invention is not limited to these data parameters, which are given only by way of example.

At block 110, the algorithm uses the captured data to make an assessment of each engine's thermal state prior to completion of the engine start sequence. This is accomplished by applying a set of logic to the evaluation data. For example, the oil temperature being equal to the ambient temperature indicates that the engine has been shut down for a long time. It is thus determined that the engine had a cold thermal state at start-up. Similarly, the high pressure turbine shroud temperature being equal to ambient temperature indicates that the engine has been shut down for a long period of time. If the oil and high pressure turbine shroud temperatures are greater than ambient, the time since the last engine shut-down can be determined by models of the temperature decay characteristics. A similar strategy can be applied to EGT measurements.

Meanwhile, at block 112, engine performance data parameters sensed by the data sensors 20 and aircraft data sensors 21 are continuously sampled. These data parameters are also typically sampled at a high frequency, such as every 15–60 milliseconds, to collect a large volume of data points. The data parameters sampled at block 112 relate to engine performance and are ultimately used in a diagnostic trending analysis for monitoring engine performance. For example, data parameters sampled at block 112 can include data such as fan speed, core speed, EGT, engine fuel flow, altitude, ambient pressure, total temperature, Mach number, compressor inlet and exit temperature, compressor exit pressure, engine pressure ratio, oil temperature, high pressure turbine shroud temperature, active clearance control valve positions, engine customer bleed settings, and all parameters calculated within the ECUs, although this step is not limited to these particular data parameters.

Next, each data sample collected at block 112 is normalized to a particular thermal state, as shown at block 114. The normalization is based on the thermal state assessment for each engine 12, 13 made at block 110. In particular, the engine start-up performance data is normalized for the corresponding thermal state prior to start-up so that the data can be compared to reference data that was collected during a flight in which the engine had a different thermal state prior to start-up. This will thus eliminate the affect that different bearing, rotor clearances, or similar effects during start-up will have on the subsequently collected engine performance data.

The normalized engine performance data is then trended against reference data, as indicated at block 116, to monitor engine performance. The normalized data for each engine 12, 13 are compared to a parametric baseline derived from similar data obtained from prior flights. Because the engine performance data has been normalized, it does not matter if the historical data was obtained from prior flights in which the engines had a different thermal state at start-up. Deviation of the current normalized data from the historical values may be an indication of potential engine performance degradation.

The foregoing has described a method and apparatus for monitoring engine performance independently of the engine's thermal state prior to engine start-up. While specific embodiments of the present invention have been described, it will be apparent to those skilled in the art that various modifications thereto can be made without departing from the spirit and scope of the invention as defined in the appended claims.

What is claimed is:

1. A method of monitoring engine performance in a gas turbine engine, said method comprising:
   sensing data related to the operation and performance of said gas turbine engine;
   continuously sampling selected data parameters from said sensed data prior to completion of an engine start sequence;
   evaluating said data parameters to determine whether specific criteria have been met;
   capturing evaluation data when said specific criteria are met; and
   using said evaluation data to normalize engine performance data to a particular thermal state of said gas turbine engine.

2. The method of claim 1 wherein said selected data parameters include one or more of core speed and fuel flow.

3. The method of claim 1 wherein said gas turbine engine includes a starter valve and said criteria include said starter valve being open.

4. The method of claim 1 wherein said criteria include core speed exceeding a predetermined value.

5. The method of claim 1 wherein said criteria include fuel flow being off.

6. The method of claim 1 wherein said evaluation data include one or more of oil temperature, high pressure turbine shroud temperature, ambient temperature, exhaust gas temperature and core speed.

7. The method of claim 1 further comprising trending said normalized engine performance data by comparing it to a parametric baseline for said gas turbine engine.

8. The method of claim 1 wherein normalizing engine performance data to a particular thermal state includes determining said gas turbine engine's thermal state at engine start-up from said evaluation data.

9. A method of monitoring engine performance in a gas turbine engine, said method comprising:
   using a plurality of sensors to sense data related to the operation and performance of said gas turbine engine;
   initiating an engine start sequence for said gas turbine engine;
   continuously sampling selected data parameters from said sensed data prior to completion of said engine start sequence;
   continuously sampling engine performance data parameters from said sensed data;
   evaluating said selected data parameters to determine whether specific criteria have been met;
   capturing evaluation data when said specific criteria are met;
   using said evaluation data to assess said gas turbine engine's thermal state at engine start-up;
   normalizing said engine performance data parameters for said thermal state; and
   trending said normalized engine performance data parameters by comparing them to a parametric baseline for said gas turbine engine.

10. The method of claim 9 wherein said selected data parameters include one or more of core speed and fuel flow.

11. The method of claim 9 wherein said gas turbine engine includes a starter valve and said criteria include said starter valve being open.

12. The method of claim 9 wherein said criteria include core speed exceeding a predetermined value.

13. The method of claim 9 wherein said criteria include fuel flow being off.

14. The method of claim 9 wherein said evaluation data include one or more of oil temperature, high pressure turbine shroud temperature, ambient temperature, exhaust gas temperature and core speed.

15. The method of claim 9 further comprising trending said normalized engine performance data by comparing it to a parametric baseline for said gas turbine engine.

16. A system for monitoring engine performance in a gas turbine engine, said system comprising:

a plurality of sensors for sensing data related to the operation and performance of said gas turbine engine;

means for continuously sampling selected data parameters from said sensors prior to completion of an engine start sequence;

means for evaluating said data parameters to determine whether specific criteria have been met;

means for capturing evaluation data when said specific criteria are met; and means for using said evaluation data to normalize engine performance data to a particular thermal state of said gas turbine engine.

17. The system of claim 16 wherein said means for using said evaluation data to normalize engine performance data to a particular thermal state of said gas turbine engine includes means for determining said gas turbine engine's thermal state.

18. A computer-readable medium containing instructions for controlling a computer-based system having a plurality of sensors for sensing predetermined parameter values related to the operation and performance of a gas turbine engine to perform a method comprising the steps of:

continuously sampling selected data parameters from said sensors prior to completion of an engine start sequence;

evaluating said data parameters to determine whether specific criteria have been met;

capturing evaluation data when said specific criteria are met; and using said evaluation data to normalize engine performance data to a particular thermal state of said gas turbine engine.

\* \* \* \* \*